Figure 1:
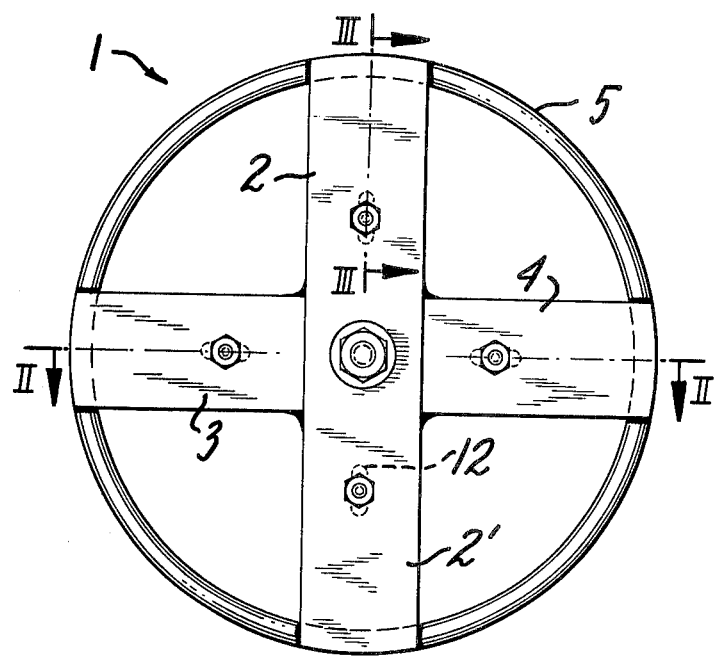

United States Patent [19]

Budrioli

[11] 4,153,497

[45] May 8, 1979

[54] DEVICE FOR THE RECAPPING OF TIRES

[75] Inventor: Elio Budrioli, Turin, Italy

[73] Assignee: Compagnie Generale des Establissements Michelin, Clermont-Ferrand, France

[21] Appl. No.: 870,760

[22] Filed: Jan. 19, 1978

[30] Foreign Application Priority Data

Jan. 20, 1977 [FR] France .............. 73.01843

[51] Int. Cl.² .................................. B29H 5/04
[52] U.S. Cl. ............................ 156/394; 156/96; 211/20; 301/11 CD; 301/23; 425/17; 425/36
[58] Field of Search ............ 156/96, 123 R, 126-129, 156/394; 425/11, 17, 36; 301/5 R, 9 R, 10 R, 11 CD, 23; 211/20

[56] References Cited

U.S. PATENT DOCUMENTS

| | | | |
|---|---|---|---|
| 2,447,035 | 8/1948 | Shell | 425/17 |
| 3,038,203 | 6/1962 | Gross | 156/394 X |
| 3,236,709 | 2/1966 | Carver | 156/96 |
| 3,779,833 | 12/1973 | Reppel | 156/96 |
| 3,809,592 | 5/1974 | Dennis et al. | 156/96 |
| 3,883,382 | 5/1975 | Pelletier | 156/96 |
| 3,884,739 | 5/1975 | Hindin et al. | 156/96 |
| 3,966,535 | 6/1976 | Abularach | 156/394 |
| 4,013,499 | 3/1977 | Benigni | 156/394 |

Primary Examiner—John E. Kittle
Attorney, Agent, or Firm—Brumbaugh, Graves, Donohue & Raymond

[57] ABSTRACT

A device for simultaneously supporting a tire which is to be recapped and for applying hermetically against the sidewalls of said tire a flexible sheathing which is connected to a source of vacuum comprises support means for supporting the tire by its beads and for varying the distance between the beads; annular means intended to be applied against the flexible sheathing in the region of the sidewalls of the tire; bearing means supporting both said support means and said annular means, said bearing means facing each other with an adjustable axial distance between them; and connecting means connecting said bearing means to each other and making it possible to vary the distance between said bearing means.

2 Claims, 5 Drawing Figures

DEVICE FOR THE RECAPPING OF TIRES

This invention relates to a device which makes it possible both to support a tire which is to be recapped with a new tread and to apply a flexible sheathing connected to a source of vacuum hermetically against the sidewalls of said tire, each of which sidewalls terminates in a bead.

For recapping a tire with a new tread which has been previously sculpted and vulcanized, it is known to use an airtight flexible sheathing, for instance of plastic, rubber, etc., which surrounds said tread and the side portions of which extend along the sidewalls of the tire in the direction towards the beads of the tire, which sheathing is connected to a source of vacuum. A sheathing of this type is described, for instance, in U.S. Pat. No. 3,236,709.

Various known devices for hermetically applying the edges of such a sheathing against the sidewalls of a tire consist of rigid or elastic rings which do not support the tire. In order to support the latter it is necessary, therefore, for a separate device to be provided. Furthermore, the pressure exerted by these rings against the sidewalls of the tire is not uniform along the entire circumference of the tire, particularly in the case of a radial carcass tire, since the sidewalls of this type of tire are very flexible and tend to yield readily under the axial pressure exerted by these rings, so that the desired tightness for the establishing of the vacuum between the flexible sheathing and the sidewalls of the tire is jeopardized.

The object of the invention is to provide a device of the type described above which, in itself, assures the dual function of supporting the tire and improving the seal between the flexible sheathing and the sidewalls of the tire and which is easy to use and furthermore inexpensive to manufacture.

In order to achieve this object, the invention provides a device in which the function of supporting the tire contributes to the sealing function. The device in accordance with the invention is characterized by the fact that it comprises:

(a) support means for supporting the tire by its beads and for varying the distance bwtween the beads;

(b) annular means intended to be applied against the flexible sheathing in the region of the sidewalls of the tire;

(c) bearing means supporting both said support means and said annular means, said bearing means facing each other with an adjustable axial distance between them; and (d) connecting means connecting said bearing means to each other and making it possible to vary the distance between said bearing means.

The support means can be formed, for instance, of at least three axial elements terminated by a hook-shaped portion intended to be engaged on the inside of the tire. These axial elements may axially traverse the bearing means and be rotatable so that the hook-shaped portion can be retracted in order to make it possible to put the tire in place in the device or withdraw it therefrom. They are preferably arranged at an equal angular distance from each other on a circle whose diameter is substantially equal to that of the base of the beads of the tire which is to be received in the device. In one particular embodiment of the device, passageways are provided in the bearing means for these axial elements, which passageways are of oblong shape in radial direction so that the diameter of the circle on which the axial elements can be disposed may be adapted precisely to the diameter of the base of the beads of the tire.

The annular means can be formed, for instance, of two rigid metallic rings whose diameter is between that of the largest circle on which the support means can be arranged and the largest dimension of the bearing means. The cross section of these rings is preferably circular, whether solid or tubular. In one embodiment of the device, these rings are inflatable rather than rigid.

The bearing means can be formed, for instance, of two plates, disks, or spiders; they each can have passageways for the support means.

The connecting means can be formed, for instance, of a threaded axial rod which passes through the bearing means at their center and is attached to them. A tubular cross bar may surround said threaded axial rod in order to maintain the desired spacing between the two plates, disks, or spiders which constitute the bearing means.

Figure 3:
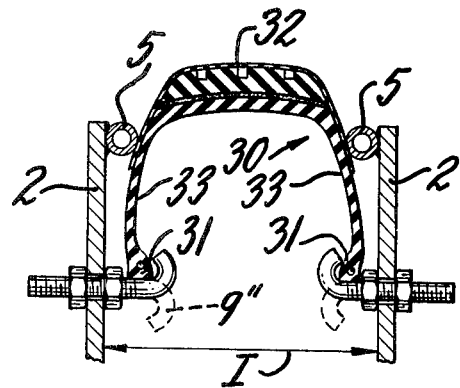
Figure 2:
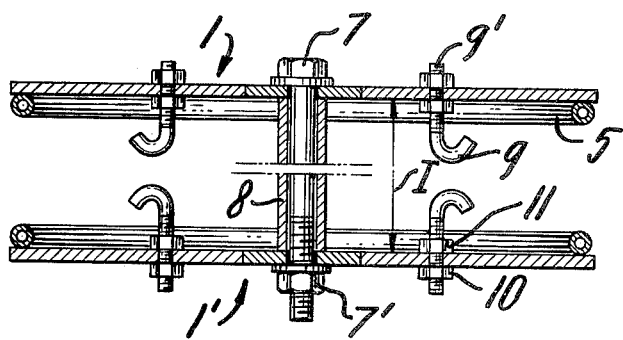
Figure 4:
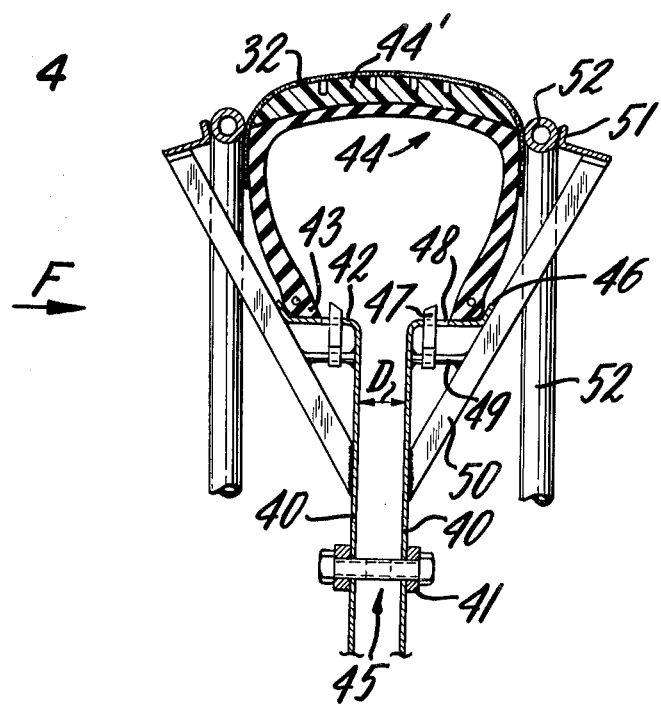

Two nonlimitative embodiments of the invention are described in detail below with reference to the drawing in which:

FIG. 1 is a side elevational view of a device in accordance with the invention in which the bearing means each consists of a spider, FIG. 2 is a sectional view along the line II—II of FIG. 1, FIG. 3 is a sectional view along the line III—III of FIG. 1, shown on a larger scale and limited to only a portion of the device in order to show a tire in position in the device, FIG. 4 is a sectional view similar to FIG. 3 but showing a tire positioned in a device which constitutes a variant of the embodiment shown in FIGS. 1 to 3, and FIG. 5 is a side elevational view along the arrow F in FIG. 4 of a portion of the device in accordance with FIG. 4.

The device shown in FIGS. 1 to 3 comprises two spiders 1 and 1' of flat iron, each having four radial arms 2, 2', 3 and 4 located in the same plane which are assembled to each other by welding and connected together at their end by a rigid tubular ring 5 which is welded to each of these arms 2, 2', 3 and 4 on one of their faces.

The two spiders 1 and 1' are removably attached to each other, as shown in FIG. 2, by means of a bolt 7 which passes concentrically through both of them and is held by a nut 7'.

Between these two spiders 1 and 1', there is a space I the length of which is determined by a tubular cross bar 8 which surrounds the shaft of the bolt 7 and is in contact with each of the two spiders 1 and 1'. The value of the distance I depends on the width of the tire 30 (FIG. 3) which is to be supported.

Between the end of each of the arms 2, 2', 3 and 4 and the central axis of each spider 1 and 1', which is represented physically by the shaft of the bolt 7, there is arranged a tire supporting means in the form of a hook 9 having a threaded linear section 9' by which said supporting means can slide axially in the arm, that is to say parallel to the axis of the central bolt 7, in order to move the hook 9 in the arm in question further away or closer. The axial position selected can be secured by means of an outer nut 10 and an inner nut 11. The hole provided in each arm 2, 2', 3 and 4 to receive the linear section 9' of the hook 9 for supporting the tire 30 may be oblong in radial direction, as represented by the dotted line 12 in FIG. 1, so that the radial position of the hooks 9 can be adapted to the inside diameter of the base of the beads 31 of the tire 30.

The working position of the hooks 9 is that shown in FIG. 2 and in solid line in FIG. 3. In order to facilitate the placing of the tire 30 in the hooks 9, the latter can be rotated around their axis so that the hooks 9 face towards the central axis of the spider 1 or 1', as shown at 9" in FIG. 3.

After the tire 30, provided with a flexible sheathing 32, has been placed between the two spiders 1 and 1' with its beads 31 resting on the hooks 9, the latter are acted on so as to move the beads 31 of the tire 30 apart in order to bring them close to each of the two spiders 1 and 1'. This displacement of the beads 31 imposes a stress on the sidewalls 33 of the tire 30 which causes them to swing around their point of contact with each of the two rings 5, which has the result of assuring a uniform contact all around the circumference of the tire 30 between the rings 5 and the sidewalls 33 of the tire 30 via the interposed flexible sheathing 32. It will, therefore, be understood that the device in accordance with the invention does not operate simply by bringing the two spiders 1 and 1' towards each other in order to compress the tire 30 between them, as is the case of the devices known up to the present time.

Figure 5:
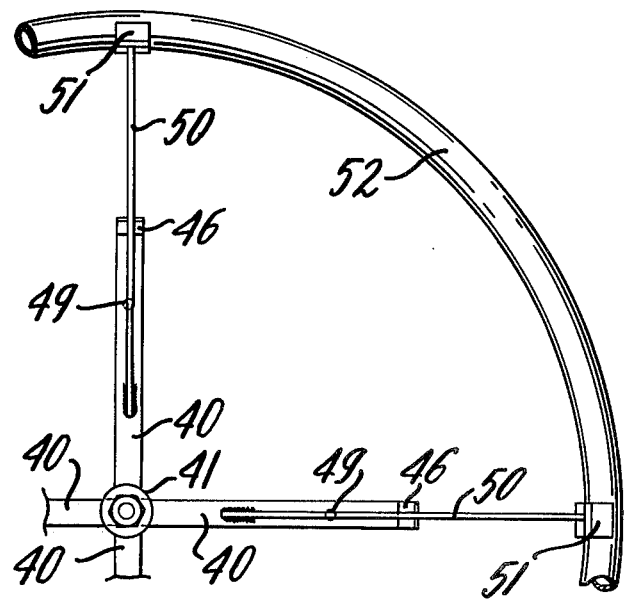

The device shown in FIGS. 4 and 5 comprises four radial arm holders 40 of flat iron which intersect at a right angle, each being fastened to a hub 41. Each of these arm holders 40 terminates in a portion 42 which is bent at a right angle to form a seat on which the base of a bead 43 of a tire 44 can rest. The arm holders 40 are separated pair-wise, by a system 45 comprising threaded members and nuts, which make it possible to vary as desired the axial distance D between one of a pair of arm holders 40 and the other one.

In order that each bead 43 of the tire 44 can move only within certain limits in axial direction, the end of the bent portion 42 of each arm holder 40 forms a flange 46 on the heel side of the bead 43, while on the toe side of said bead 43 there is provided a finger 47 which can slide in an axial slot 48 provided in the bent portion 42 of each arm holder 40. This finger 47 is slideably mounted on a rod 49 which is welded at one end to the flat side of the radial portion of the arm holder 40 and welded at the other end to the edge of a flat iron arm 50. This arm 50 is in its turn welded on edge to the arm holder 40 in the vicinity of the hub 41 and extends diagonally, so as to pass along the flange 46 of the bent portion 42 of the arm holder 40 so that the edge of said arm 50 can be fastened by welding to said flange 46. The arm 50 extends beyond the flange 46 and terminates in a ring-holder 51 on which there is welded a tubular ring 52 arranged in the plane parallel to the arm holder 40. As in the case of FIG. 3, this ring 52 is intended to be applied against a flexible sheathing 32 which circumferentially surrounds the crown of the tire 44 provided with its new prevulcanized tread 44'.

What is claimed is:

1. Device for supporting a tire which is to be recapped and for applying hermetically against the sidewalls of said tire a flexible sheathing which is connected to a source of vacuum, said device being characterized by the fact that it comprises:
    (a) support means for supporting the tire by its beads and for varying the distance between the beads, said support means being each formed of axial elements terminated by a hook-shaped portion intended to be engaged on the inside of the tire;
    (b) annular means intended to be applied against the flexible sheathing in the region of the sidewalls of the tire;
    (c) bearing means supporting both said support means and said annular means, said bearing means facing each other with an adjustable axial distance bwtween them; and
    (d) connecting means connecting said bearing means to each other and making it possible to vary the distance between said bearing means.

2. Device for supporting a tire which is to be recapped and for applying hermetically against the sidewalls of said tire a flexible sheathing which is connected to a source of vacuum, said device being characterized by the fact that it comprises:
    (a) support means for supporting the tire by its beads and for varying the distance between the beads, said support means being each formed of a bent portion terminating a bearing means, said bent portion being terminated by a flange and having an axial slot in which a finger capable of sliding on an axial rod fastened to said bearing means can be moved axially;
    (b) annular means intended to be applied against the flexible sheathing in the region of the sidewalls of the tire;
    (c) said bearing means supporting both said support means and said annular means, said bearing means facing each other with an adjustable axial distance between them; and
    (d) connecting means connecting said bearing means to each other and making it possible to vary the distance between said bearing means.

* * * * *